United States Patent [19]

Hanke

[11] 3,776,001

[45] Dec. 4, 1973

[54] SELF-LUBRICATING COMPOUND FOR USE IN HYGIENIC AND MEDICAL APPLICATIONS, AND SUPPOSITORIES MADE THEREFROM

[75] Inventor: David E. Hanke, Neenah, Wis.

[73] Assignee: Kimberly-Clark Corporation, Neenah, Wis.

[22] Filed: Jan. 16, 1973

[21] Appl. No.: 324,092

Related U.S. Application Data

[62] Division of Ser. No. 127,818, March 24, 1971.

[52] U.S. Cl. ................................. 128/271, 424/32
[51] Int. Cl. ............................................. A61f 15/00
[58] Field of Search..................... 128/264, 270, 271; 424/16, 32, 38

[56] References Cited
UNITED STATES PATENTS

| 2,477,292 | 7/1949 | Fessenden............................ 128/271 |
| 2,616,424 | 11/1952 | Brown et al. ......................... 128/264 |
| 2,808,832 | 10/1957 | Myers et al. ......................... 128/285 |
| 3,415,249 | 12/1968 | Sperti................................. 128/271 |
| 3,485,651 | 12/1969 | Ganz................................... 128/271 |
| 3,639,562 | 2/1972 | Gordon et al........................ 128/271 |

FOREIGN PATENTS OR APPLICATIONS

| 722,629 | 1/1955 | Great Britain....................... 128/285 |
| 735,370 | 8/1955 | Great Britain....................... 128/285 |

*Primary Examiner*—Charles F. Rosenbaum
*Attorney*—Daniel J. Hanlon, Jr. et al.

[57] ABSTRACT

A self-lubricating compound especially suitable for hygienic and medical applications, such as for coating tampons and as suppository structures. The compound contains a thermoplastic film-forming water-soluble polymer, a compatible plasticizer for the polymer, and a lubricant. The lubricant is characterized by the ability to form a homogeneous blend, an intimate physical mixture, or a solution with the polymer at elevated temperatures when the blend or solution is in a fluid state while being incompatible therewith at lower temperature when the blend solidifies. In the solidified state of the compound the lubricant may exist as discrete globules dispersed throughout the compound, and the globules which are disposed on and close to the exposed surface of the solidified blend tend to merge whereby a lubricous film is provided on that surface. The compound is thermoplastic and may be cast, thermoformed, hot melt dip-coated, or transfer molded.

14 Claims, No Drawings

SELF-LUBRICATING COMPOUND FOR USE IN HYGIENIC AND MEDICAL APPLICATIONS, AND SUPPOSITORIES MADE THEREFROM

This application is a division of copending application Ser. No. 127,818 filed Mar. 24, 1971.

RELATED APPLICATIONS

David E. Hanke, Ser. No. 127,853 filed on Mar. 24, 1971.

BACKGROUND OF THE INVENTION

In the hygienic and medical field there is a need for a water-soluble compound which at ambient or room temperature is in the form of a tough but soft and flexible solid, or in the form of a flexible film each of which has the ability to dissolve readily upon contact with body fluids. The solidified compound preferably should have an intrinsic or self-contained lubricous surface to essentially eliminate frictional resistance when in contact with the body.

A further and important characteristic is that the compound be stable at room tempratures, i.e. from about 68° to 75°F, up to at least 150°F and higher.

One area of activity in which there is a special need for a water-soluble compound with a self-contained lubricous surface is as an insertion-aid coating for application to at least the tip portion of compressed absorbent tampons. Another potentially useful area is in the suppository field where such compounds may also be used as the structural portion of a suppository while functioning as a vehicle or carrier for medicaments. While ther are many potential uses for the type of compound which meet the above characteristics, the following description will relate principally to the application of such a compound in the tampon and suppository field.

DISCUSSION OF THE PRIOR ART

Prior to this invention, insertion-aid coatings for tampons consisted primarily of two types. In one type the entire coating, or a major portion thereof, was comprised of a lubricant such as liquid petrolatum, emulsified mineral oil, soft waxes or the like. While these coatings functioned well as lubricants, they were detrimental to the absorptive capabilities of the tampon and relatively unstable at the elevated temperatures normally met in shipping and storage, such as 150°F.

As the art developed a second type of insertion-aid coating was introduced. In this second type the coating was changed to one which was fluid-soluble and preferably had a surface which was smooth when dry and slippery when wet. A long list of such coatings may be found in U.S. Pat. Nos. 2,340,311 of Feb. 1, 1944 and 2,440,141 of Apr. 20, 1948. In the type coatings defined in these patents, insertion ease depended primarily upon a reduced friction obtained by having a surface with the "properties of smoothness when dry and slipperiness when wet." In accordance with those teachings, the coatings had no real lubricating effect until the surface was moistened. It has also been found that many of the suggested coatings deteriorate at the high temperatures encountered under normal shipping and storage conditions whereby their initial utility is virtually destroyed by aging.

Efforts to obtain a lubricating effect by utilizing internal mobility of the coating itself prompted the more recent introduction of various combinations of polyethylene glycols for such use, in combination with various other materials. Assignee's copending application Ser. No. 807,490 filed Mar. 17, 1969 and now U.S. Pat. No. 3,595,236, describes coatings of this nature. In essence the coatings described in this application are mixtures of at least two polyethylene glycols, each of a different molecular weight, plus powdered starch or similar fillers. These coatings as initially applied to the tampons have a smooth velvety appearance and have a surface which is not tacky or sticky to the touch. When these coatings are applied to the tampon by dipping, spraying or the like, they do not immediately penetrate into the tampon body or cause it to re-expand. This, of course, is a desirable feature, especially for highly-compressed, self-sustaining tampon bodies which must retain their compressed state during processing. In their prime condition the interior portion of these coatings remains sufficiently mobile to provide some slip by a shearing action which reduces friction and aids insertion. However, it has been found that as the coatings age and are subjected to high temperatures during shipping and storage, fluid portions migrate into the tampon body leaving the higher molecular weight polyethylene glycols to crystallize internally and on the coating's surface. This migration and crystallization causes the coatings to crack and to dry out to a point where they no longer can perform their intended function.

In reviewing the prior art directed to suppositories, it will be found that most suppositories now being marketed have a base of cocoa butter, hydrogenated fats or similar natural and synthetic fatty substances which have a melting point approximately that of normal body temperature. Another common type of suppository comprises soft gelatin capsules which contain an oleaginous fluid plus analgesics or medicaments. Both types rapidly liquefy or release fluids shortly after being inserted in the body. This liquefaction often results in a gushing discharge of fluid from the body orifice, which, of course, is highly undesirable. Many types of suppositories must be kept under refrigeration to prevent premature melting. In addition suppositories having a water-soluble base have limited stability and lose water in storage with resultant gross changes in shape and aesthetics. In certain types of suppositories, thin protective coatings, which may also contain meidcaments or the like, are sometimes used to reduce premature melting. In any event, the reliance of body heat for liquefaction and distribution of medicaments is at best an undesirable condition, so that when suppositories in general are used special care must be taken to prevent the liquefied substance from inadvertently running out and soiling clothing or bed linens. This probelm is so severe as to limit the usage of some suppositories to situations which require the body to be in a supine or prone position when applied, in order to maintain the active fluid ingredients within the body cavity.

The compound of this invention works on a different principal than the prior art compounds used for coating tampons and for suppository structures, while overcoming the respective disadvantages for each as mentioned above. The compound comprises a thermoplastic water-soluble film-forming polymer which by itself has little or no lubricity. When the polymer is processed as described in this invention, the resulting compound has distributed throughout its structural matrix and on its surface a lubricant which provides an initial spontaneous lubricity to the non-eroded surface of the compound to ease insertion immediately, as well as adding lubricity to newly-exposed surface as the compound is eroded away by a dissolving action such as may be provided by continued contact with aqueous body fluids. Such controlled "erosion" will continually release fresh medicaments, whether these medicaments are water-soluble and dissolved or dispersed in the polymer, or oleophiles contained in the dispersed oil globules which are entrapped within the polymer matrix.

Accordingly, it is the principal object of this invention to provide a heat stable self-lubricating water-soluble compound in which the lubricant is combined within the structure in a manner to be immediately present on the surface.

An additional object is to provide a compound in which the lubricous-surface effect is self-generating as internally trapped lubricant becomes exposed when surface portions are removed by friction, solvation or erosion.

It is a further object of the invention to provide a similar heat stable spontaneously-generated self-lubricating water-soluble coating for absorbent tampons.

Another object is to provide a heat stable self-lubricating water-soluble compound suitable for use in suppositories, which compound serves as a vehicle for medicaments as well as being the matrix or supporting structure therefor.

Other advantages will become apparent by reference to the following summary and detailed description.

SUMMARY OF THE INVENTION

The compound of this invention is comprised of a thermoplastic film-forming water-soluble polymer in blend with a compatible organic plastizer of predetermined molecular weight. Dispersed throughout the blended compound are discrete globules of an oleaginous lubricant. Some of the globules which extend through the exposed surface portions of the compound are in physical association with each other to provide a lubricous film on the exposed surface giving the compound instant surface lubricity.

A preferred thermoplastic polymer is hydroxypropyl cellulose (hereinafter sometimes referred to as HPC). Preferred plasticizers are the olefinic glycols which include polyethylene glycols (hereinafter sometimes referred to as PEG) having an average molecular weight of more than 200 and less than about 1500, and polypropylene glycols (hereinafter sometimes referred to as PPG) having an average molecular weight less than about 750. Preferred lubricants include polypropylene glycol (PPG) having a minimum average molecular weight of about 1000, glycerine, natural and synthetic fats which are fluid at room temperature, and mineral oils. The PPG is especially useful with the PEG plasticizer, while the mineral oil, fats, and glycerine work better when PPG is employed as the plasticizer for the HPC.

In order to avoid unnecessary repetition and for the sake of brevity in the following description, the above-identified letter abbreviations will frequently be used to identify the polymers and plasticizers used in the specific examples. The numbers following the letter abbreviations will serve to identify the approximate molecular weight. For example, PEG 400 will mean polyethylene glycol with an average molecular weight of about 400, and HPC 75,000 will mean hydroxypropyl cellulose with an average molecular weight of about 75,000.

In one method of preparing the compound, the plasticizer is heated to a temperature of about 285°F in an inert atmosphere and under continuous agitation. The oleaginous material is then added and vigorously mixed therein. Then the thermoplastic water-soluble polymer is added and while the mixture is under continuous agitation the temperature is raised sufficiently high to obtain a well-dispersed physical blend when some of the ingredients are incompatible, or a clear solution when all the ingredients are compatible. The blended mixture is then cooled to about 265°F at which point suitable medicaments, colors and/or fillers may be added, if desired.

The coating may now be applied to tampons by dipping the tampon tips therein and allowing the coating to set. Suppositories may be made from the mixture by casting, or by thermoforming, or by transfer molding procedures.

DETAILED DESCRIPTION

The following discussion will be useful in providing additional background as well as identifying suitable molecular weights for the plasticizers and polymers employed.

Hercules, Incorporated, a supplier of hydroxypropyl cellulose, under the registered trademark KLUCEL, indicate on page 8 of their 1968 technical brochure, which is further identified by the number 879–32327, that high molecular weight polyethylene glycols and high molecular weight polypropylene glycols are compatible with hydroxypropyl cellulose at elevated temperatures. However, it has been found that the polyethylene glycols and polypropylene glycols which the art classifies as "high molecular weight" polymers are not compatible. For example, hydroxypropyl cellulose in the lower commercially available molecular weight range (about 75,000) is totally insoluble in the polyethylene glycols and the polypropylene glycols rates as high molecular weight polymers.

An examination of the molecular weights used commercially such as are identified on page 6 of Union Carbide's 1970 brochure entitled "Chemicals and Plastics Physical Properties" (F-6136X, 11/69 – 40M) finds that the high molecular weight polyethylene glycols start at about 1500. It has been found that PEG with a molecular weight of 1500 is completely incompatible with HPC 75,000 at both ambient and elevated temperatures. Compatibility was found to begin somewhere between a PEG molecular weight of 1000 and 1500.

Page 12 of the same Union Carbide brochure cited above discloses high molecular weight polypropylene glycols begin at about 1007.

A similar observation may be made by reference to page 3 of Dow's technical brochure Form No. 111–43-0–69 on polypropylene glycols.

In accordance with this invention, and as indicated above, compounds having the aforementioned characteristics may be formed by using hydroxypropyl cellulose as the thermoplastic film-forming water-soluble polymer and selected polyethylene glycols or selected polypropylene glycols as the compatible plasticizing polymer. Propylene glycols and their polymers as well as mineral oils, glycerine, and natural and synthetic fats which are fluid at room temperature may be used as the incompatible oleaginous agent. The use of various PEG's alone and in combination with oleaginous agents will first be described.

In working up to the development of a suitable compound, many tests were made of various combinations of HPC and PEG as the sole ingredients to determine if mixtures of only these two ingredients would be useful for the purposes described While none of these two component mixtures proved to be satisfactory for tampon coating and suppository use as the compounds which also contained oleaginous agents as lubricants, certain mixtures of HPC and some intermediate weight PEG's and PPG's were nevertheless found to be improvements over most tampon coatings and suppositories presently in use because they exhibited what is defined as a shear-dependent lubricity. A more detailed definition of the latter as well as preferred examples of these two-component coatings may be found in any co-pending application Ser. No. 127,853 filed Mar. 24, 1971.

The following are some examples the development work covered:

EXAMPLE 1

120 grams of PEG 200 (a colorless liquid having a molecular weight of about 200) were heated under a nitrogen atmosphere and constant stirring to a temperature of about 285°F.

85 grams of HPC 75,000 (a white powder) were added and thoroughly mixed into the heated PEG 200 while the temperature was raised to about 320°F. A clear, very viscous solution was obtained. The mixture was coated on the end of a tampon by dipping the tampon tip in the heated solution. The resulting coating was sticky, runny, and generally unstable and smeary after cooling, never taking a good set. Accordingly, this example was adjudged completely unsatisfactory for tampon or suppository use.

EXAMPLE 2

This was the same as Example 1, except that 30 grams of PPG 1000 were added before mixing in the HPC. Stickiness was eliminated but results were still unsatisfactory as in Example 1, even though the coating has some instant surface lubricity. The coating was too soft and smeary to be practical.

EXAMPLE 3

This was the same as Example 1 except that 30 grams of PPG 2000 were added before mixing in the HPC. As in Example 1, a clear solution was obtained. The compound was coated on a tampon giving a clear, shiny coating. When rubbed with the fingers a lubricous effect similar to petroleum jelly was observed. While this lubricity was judged to be desirable as a lubrication-aid, the fact that the coating did not take a firm set but remained somewhat smeary in consistency dictates against its use on a commercial basis because of aesthetics an difficulties encountered in packaging such as the undesirable transfer of the coating to wrappers or cartons.

EXAMPLE 4

120 grams of PEG 200 were used as in Example 1 and heated to 285°F under nitrogen. 30 grams of HPC 275,000 were added with agitation and dissolved at about 305°F. The mixture was very thick and dipped tampon coatings were runny, tacky, very soft, and smeary. The coating was adjudged completely unsatisfactory for coating tampons and the like.

EXAMPLE 5

This was identical to Example 4 except that 20 grams of PPG 2000 were added with vigorous mixing at 300°F. The tampon coatings had spontaneous surface lubricity but were much to smeary to be workable as tampon coatings. This is an example of a coating with instant lubricity but with an unstable polymer matrix due to the high efficiency of the low molecular weight PEG 200 as a plasticizer.

EXAMPLE 6

120 grams of PEG 400 (also a colorless liquid and having a molecular weight of about 400) were heated under a nitrogen atmosphere and under constant stirring to a temperature of about 285°F. 30 grams of HPC 75,000 (a white powder) were added and thoroughly mixed in the PEG 400 while the temperature was raised to about 320°F and a clear solution achieved. The mixture was coated on the end of a tampon by dipping the tampon tip into the heated solution. The coating was quite stringy and sticky when the dipped tampon was withdrawn. The cooled and set coating had a clear and transparent appearance and was very tacky. While this coating exhibited the shear-dependent lubricity defined in my copending application, it was considered marginal for tampon coating or suppository use because of its extremely tacky nature.

EXAMPLE 7

This was prepared as in Example 6 but 40 grams of HPC 75,000 were used rather than 30 grams. The cooled and set coating on the tampon was slightly less tacky than that of Example 6 and had a somewhat rubbery feel. This coating was also considered marginal for tampon use. That is, while its resistance to insertion was somewhat less than for an uncoated tampon and therefore was an improvement over the latter, the tackiness exhibited detracts from its desirability. In addition, it still lacked the desired instant surface lubricity, depending instead upon internal shear to provide insertion ease.

EXAMPLE 8

This was the same as Example 6 but employed 50 grams of HPC 75,000. The set coating had only a slight tack and a very rubbery feel and was also in the marginal area. However, it was adjudged somewhat better than Example 7 because of the reduction in tackiness. It did not have instant surface lubricity.

EXAMPLE 9

This was the same as Example 6 but contained 60 grams of HPC 75,000. The set coating was barely tacky and very rubbery. It was considered quite satisfactory as a tampon coating because of its shear-dependent lubricity, and an improvement over Example 8. It too did not have instant surface lubricity.

EXAMPLE 10

A mixture was prepared as in Example 9 except that 30 grams of polypropylene glycol with a molecular weight of about 2000 (PPG 2000) were added. The set coating was quite rubbery and had a slight tackiness.

However, the coating also appeared to be very slightly greasy to the touch when rubbed lightly. This coating was considered useful because of the instant lubricity contributed to the surface by the PPG 2000 but was considered somewhat marginal in acceptance with respect to tack.

EXAMPLE 10A 120 grams of PEG 400 were heated under a nitrogen atmosphere and constant stirring to a temperature of about 285°F. 30 grams of HPC 275,000 (a white powder) were added and thoroughly mixed in the PEG 400 while raising the temperature to about 320°F when a clear solution was obtained. 30 grams of PPG 2000 were then added. When coated on a tampon the coating was rubbery and non-tacky and had an instantly lubricous surface. This coating and set compound was considered excellent for use with tampons and as a suppository because of its toughness and flexibility.

EXAMPLE 11

120 grams of PEG 600 (a colorless oily liquid having a molecular weight of about 600) were mixed with 30 grams of HPC 75,000 under the same conditions as in Example 6. The mixture was allowed to cool to 280°F before dipping tampons therein. As the tampon was withdrawn, the coating appeared stringy and sticky. However, after cooling and setting, the outer surface of the set coating was not tacky, but quite rubbery. Rubbing the surface of the coating with the finger provided some surface shear with the result that fresh fluid glycols were liberated or exposed on the surface at the rubbed areas. This phenomenon can be described as a shear-dependent lubricity. Because this shearing effect relieves frictional resistance, this coating was considered satisfactory for use as a tampon coating and for suppositories, even though it contained no oleaginous material to provide instant surface lubricity as in the preferred three-component embodiments described and claimed herein. Since these two-component coatings are considered improvements over the art they are included in a separately filed application as noted earlier.

EXAMPLES 12–13

These were similar to Example 11 except that in Example 12, 40 grams of HPC 75,000 were used, and in Example 13 50 grams of HPC 75,000 were used respectively. The unset coating in each case was sticky and stringy, but the set coating was found to be non-tacky and very rubbery. Again when rubbed with the fingers, the above-described sliding effect and shear-dependent lubricity was observed. These two examples were therefore also considered satisfactory for tampon coatings and suppositories for the reasons set forth for Example 11.

EXAMPLE 14

This was the same as Example 13 except that 15 grams of PPG 2000 (an oily liquid) were added as the oleaginous component. The set coating was not at all tacky and was instantly lubricous and slippery to the touch. The slippery characteristics of the surface due to the presence of PPG 2000 thereon, and absence of tack made this coating outstanding as an insertion-aid coating as well as for casting suppositories. As an example of the latter 10 mg. of menthol, 1 mg. of camphor and 16 mg. of oxyquinoline benzoate were mixed together and added to 0.5 grams of the Example 14 compound and suppositories were cast from this material. These suppositories exhibited excellent flexibility as well as the desired instant lubricity, and remained stable when exposed to body heat as well as temperatures up to 150°F. The suppositories also dissolved slowly in water.

EXAMPLE 15

This was the same as Example 13 except that 15 grams of PPG 1000 were added in place of the PPG 2000. The set coating was instantly lubricous and slippery to the touch and was also rated as outstanding for the purposes described.

EXAMPLE 16

In this Example 40 grams of HPC 75,000 were dissolved in 120 grams of PEG 600 as in Example 12. However, 35 grams of white mineral oil were added as the oleaginous component. Vigorous stirring was required to keep the mineral oil dispersed, but upon cooling and setting of the compound it was found that the mineral oil remained dispersed throughout the matrix as well as being present on the surface. The surface was therefore instantly slippery to the touch and rated satisfactory for tampon coating use although less so than the compounds described in Examples 12 and 13, where PPG 2000 and PPG 1000 respectively, were used as the oleaginous component.

EXAMPLE 17

120 grams of PEG 1000 (an opaque, waxy solid with a molecular weight of about 1000) were heated under nitrogen atmosphere to a temperature of about 300°F which was sufficiently high to melt the solid. 40 grams of HPC 75,000 were added to the hot PEG 1000 under constant sitrring to obtain a smooth blend. A tampon was dipped into this mixture to coat the end. When set the coating was relatively hard and smooth and had shear-dependent lubricity rather than having an oily surface. It was judged as suitable for coating tampons and the like, but not as good as coatings which contained an oleaginous component.

EXAMPLE 18

120 grams of PEG 1500 (a waxy solid) were melted at a temperature of about 325°F under nitrogen atmosphere and constant stirring. 30 grams of HPC 75,000 were added. The mixture remained granular and did not dissolve completely. The resulting compound was considered unsatisfactory for tampon coating or suppository use.

EXAMPLE 19

120 grams of PEG 4000 (a waxy solid) was melted as in Example 18. When 30 grams of HPC 75,000 were added, the mixture remained granular as in Example 18 and was completely unsatisfactory for the proposed use.

EXAMPLE 20

120 grams of PEG 1000 were melted as in Example 17 and 50 grams of HPC 75,000 added. It was necessary to raise the temperature to 328°F to get the HPC to dissolve. The temperature was then reduced to 290°F and 15 grams of PPG 2000 (an oily liquid) added as the oleaginous component. Tampons were coated by dipping into this mixture. The set coating was light yellow in color, but was non-tacky and had slight instant lubricity to the touch. This was adjudged as very satisfactory.

EXAMPLE 21

This was the same as Example 20 except that 30 grams of PPG 2000 were added instead of 15 grams. The resulting coat was non-tacky, instantly lubricous, and adjudged excellent.

Attempts were also made to use various molecular weights of PPG as the compatible plasticizer. It was found that the hydroxypropyl cellulose 75,000 would not dissolve in the commercially available PPG's having molecular weights over about 750, but that the commercially available PPG's having molecular weights below about 750 would dissolve the HPC 75,000. When attempts were made to use the higher molecular weight polypropylene glycols, i.e. over about 750, the HPC 75,000 remained granular and would not dissolve.

In the following example, PPG with a molecular weight of about 400 is used as the plasticizer and mineral oil is used as the oleaginous lubricant.

EXAMPLE 22

120 grams of PPG 400 (an oily liquid) were heated to 290°F under a nitrogen atmosphere. 40 grams of HPC 75,000 were thoroughly mixed therein and then 15 grams of white mineral oil added. A coating of this mixture was slightly opaque and non-tacky with an oily, slick surface. The coating was adjudged satisfactory. A similar coating without the mineral oil was transparent and rubbery with a slight tack, and very similar to the coatings employing PEG 600 only as the plasticizer.

EXAMPLE 23

This was identical to Example 22 except 40 grams of glycerine was used to replace the 15 grams of mineral oil. The reuslting tampon coatings were water white and flexible but somewhat softer than optimal. Tack was absent and there was excellent surface lubricity. Coatings were adjudged satisfactory.

EXAMPLE 24

120 grams of PPG 750 (a viscous oily liquid) were heated to about 300°F, 10 grams of HPC 75,000 were added. The mixture remained granular and would not dissolve.

EXAMPLE 25

120 grams of PPG 1000 were heated to 300°F and 10 grams of HPC 75,000 added. Again the mixture remained granular without solution.

EXAMPLE 26

This was the same as Example 25 except that PPG 2000 was used. The mixture remained granular as in Example 25.

It was found that when various glycols of different molecular weights are mixed with each other and with glycerine and oils the compatibility/incompatibility situation varies as set forth below.

In situations where HPC is added to a mixture of two different glycols which are incompatible at room temperature but which have the ability to intermix under agitation at elevated temperature and one of the glycols is a plasticizer for the HPC, the non-plasticizing glycol will separate out in the form of the oleaginous component as the compound cools and solidifies.

When the glycerine or mineral oil are mixed with the plasticizer, it also separates out as the incompatible ingredient.

The following examples are of interest in this respect:

a. PEG 200 and PPG 750 are compatible at room temperature and elevated temperature and are therefore ineffective for use in combination with HPC.

b. PEG 200 and PPG 1000 are incompatible at room temperature and compatible at greater than 114°F. While this meets the broad requirement of incompatibility at room temperature and compatibility at elevated temperature, the PEG 200 is such an efficient plasticizer for HPC 75,000 that usually large amounts of the HPC 75,000 would be required to obtain a satisfactory toughness and elasticity in the finished compound. Higher molecular weight HPC such as 275,000 or 900,000 serve to alleviate this situation. Similarly, a reinforcing filler such as colloidal silica can be added to impart internal strength to the final compound whereby the highly efficient lower molecular weight plasticizers for the HPC may still be employed to provide a usable compound.

c. PEG 200 and PPG 2000 are completely incompatible at room temperature and substantially incompatible at elevated temperature. They are relatively unsatisfactory in combination with HPC only because the efficient plasticizing effect of the PEG 200 renders the HPC too soft and smeary, as noted above, even though the desired lubricity is present. Again, a higher weight HPC or suitable filler may be used to alleviate the situation.

d. PEG 400 and PPG 750 are compatible at room temperature and higher and therefore ineffective.

e. PEG 400 and PPG 1000 are incompatible at room temperature but compatible at about 120°F and higher. The same observation as for (b) applies here, although in this case the PEG 400 is a less efficient plasticizer than PEG 200. Accordingly, with PEG 400 less HPC is necessary to obtain desired toughness and elasticity.

f. PEG 400 and PPG 2000 are completely incompatible at room temperature and substantially incompatible at elevated temperature, i.e. no solution is obtained at any temperature. However they are sufficiently compatible at elevated temperature to provide a well-mixed blend while under continuous agitation. Then when mobility of the resulting blend is limited by the increased viscosity which results through the addition of HPC 75,000, the tendency of the incompatible PPG 2000 to separate is inhibited as the material sets and the PPG 2000 remains dispersed throughout the set compound and portions of the PPG 2000 remain on its surface to provide the desired instant surface lubricity.

From the above, it will be evident that PEG 400 as the plasticizer for HPC and PPG 1000 as the oleaginous component in the blend will make a satisfactory combination since the broad compatibility/incompatibility relationship is in the desired range as defined earlier, i.e. incompatible at room temperature and compatible at elevated temperature. By following the same reasoning, the PEG 400 and PPG 2000 combination would at first appear to be unsatisfactory, since they are substantially incompatible at room and elevated temperature. Surprisingly the combination is very satisfactory since the PPG 2000 remains dispersed in the set compound as described above and the coating's instant surface lubricity becomes even more evident due to a sharper separation of PPG 2000 as the compound cools to room temperature. Compatibility as used herein therefore can be defined as the ability of two compounds to remain blended under conditions of elevated temperature and constant mixing as well as by mutual solubility.

g. PEG 600 and PPG 400 are completely compatible at room temperature. It will be seen therefore that this is not a satisfactory combination since the incompatibility requirement at room temperature does not exist.

h. PEG 600 and PPG 750 are completely compatible at room temperature and higher.

i. PEG 600 and PPG 1000 are incompatible at room temperature but completely compatible at about 140°F and higher. When the heated solution is cooled to below 140°F phase separation takes place rapidly an the instant surface lubricity occurs when used in combination with HPC.

j. PEG 600 and PPG 2000 are incompatible at room temperature and also at elevated temperature. However, the two glycol phases still blend well together upon mechanical mixing at elevated temperatures as in (f) above and as a result the PPG 2000 will remain dispersed in the set compound containing HPC. The resulting dispersion of PPG 2000 within and on the surface of the HPC matrix make this an excellent combination.

1. PEG 1000 and PPG 1000 are incompatible at room temperature but completely compatible at temperatures above about 150°F. This is a satisfactory combination.

m. PEG 1000 and PPG 2000 are completely incompatible at room and at elevated temperatures as high as 295°F. However, the above defined blending at elevated temperature occurs, making this a satisfactory combination.

n. Glycerine and PPG 400 are incompatible at room temperature and at elevated temperatures, however sufficient mixing is obtained at elevated temperature to provide the desired result when in admixture with HPC.

o. Mineral oil and PPG 400 are also incompatible at room temperature and at elevated temperature, but provide a useful combination as in (n).

Glycerine is completely soluble in PEG and therefore cannot be used as the oleaginous component in combination therewith.

It will also be seen that blends of high and low molecular weight glycols may also be used to obtian the desired average molecular weight. For example, a major amount of PEG 750 is admixture with a minor amount of PEG 200 could provide an average molecular weight in the 400 range.

It is further apparent from the above studies that various combinations of compatible and incompatible substances may be utilized in combination with the thermoplastic polymer which forms the matrix to obtain the desired results.

The following selective situation appears applicable:

1. The thermoplastic water-soluble polymer must be sufficiently compatible with the plasticizer employed to be capable of being partially soluble or completely soluble therein either at room temperature, or at elevated temperature, but in the latter case some compatibility must be maintained upon cooling;

2. The oleaginous lubricant must be capable of thorough dispersion in the polymer-plasticizer mixture at elevated temperature, whether in solution or in a physically blended condition, so that upon the cooling and setting of the polymer-plasticizer mixture the lubricant as it partially separates out will remain distributed throughout the matrix and on the surface, forming a substantially continuous lubricant film on the surface.

It becomes evident from the above studies that as one approaches the limits of compatibility of the plasticizer with a thermoplastic water-soluble polymer such as HPC, one will start to observe some spontaneous surface slip because the higher molecular weight polymeric fractions of the plasticizer become incompatible, or are incompatible at earlier stages in the setting process and serve as the incompatible oleaginous agents needed for lubricity. This is to be observed in particular when polypropylene gylcols are used as the plasticizers.

Another general observation which may be used in selecting useful combinations is that the solubility of PPG in a PEG of specified molecular weight is inversely proportional to the molecular weight of the PPG. This is as the weight of the PPG increases it becoomes less soluble in a particular PEG.

In general, the examples described above show that lower molecular weight glycol plasticizers are more efficient than the higher weight materials in plasticizing HPC. Consequently, to obtain a coating or suppository that will maintain sufficient body and integrity, it is necessary to use a higher weight fraction of the thermoplastic polymer in the compound as molecular weight of the plasticizer is reduced. It becomes evident that integrity will also be improved if the same amount of a higher molecular weight thermoplastic polymer is used to replace the HPC 75,000 as employed in all the above examples. Similarly, in order to obtain comparable hardness or integrity, when a lower molecular weight HPC is used a higher weight fraction of the lower weight HPC would be required with the same amount of plasticizer as was used with the higher molecular weight HPC.

The examples also demonstrate that plasticizer efficiency with a given molecular weight HPC decreases with increasing molecular weight of the plasticizer. In most cases, therefore, in order to provide optimum use of ingredients the molecular weight of the plasticizer should be high enough to produce a firm, rubbery compound.

In addition the examples clearly show that high molecular weight PEG, i.e. 1500 and above, and high molecular weight PPG, i.e. 750 and above, will not dissolve HPC 75,000 and therefore are unsatisfactory as plasticizers.

When an HPC of lower molecular weight than 75,000 was used it too was found incompatible with the high molecular weight PEG and PPG. It follows that higher molecular weight HPC would also be incompatible with these higher molecular weight plasticizers.

From the above examples, an by interpolation, it may also be derived that PEG's with an average molecular weight somewhat above 200 and somewhat below 1500 will serve as suitable plasticizers for the HPC. The saem reasoning can be applied to the PPG's wherein suitable plasticizers will have a molecular weight of less than about 750. When the polypropylene glycol is used as the oleaginous agent it should have an average molecular weight of at least about 1000.

While the described compounds are suitable for use without additives for coating tampons and fabricating suppositories, it is evident that a large number of compatible medicaments may be readily employed. This is especially true with respect to suppositories. The gradual solvation characteristic of the compound in suppository form when exposed to body fluids provides a means for applying long-lasting controlled release medication to areas selected for treatment.

The medicaments used may be hydrophilic, oleophilic, or both. When hydrophilic they are readily dispersed throughout the water-soluble polymer matrix. When oleophilic they are readily dissolved in the oleaginous or lubricant portion of the compound.

Substances which are especially suitable for use include bactericides, fungicides, antibiotics and the like. In connection with the coated absorbent tampons and vaginal suppositories made in accordance with this invention such substances include the following:

Menthol; camphor; quaternary ammonium salts; 5-Amino-1, 3-bis (2-ethylhexyl) hexahydro-5-methylpyramidine also identified in short form as hexetidine; chloramphenicol; 2-(Tetradecylamino) ethanol lactate also identified in short form as myraldact; $\beta$, 4-Dichloro-$\alpha$-dichloro-acetamidopropiophenone also identified in short form as cloponone; nystatin; 3-Acetamide-4-hydroxyphenylarsonic acid also identified as acetarsone; 5-nitrofurfuraldehyde-semicarbazone also identified as nitrofurazone; benzalkonium chloride and hexachlorophene.

The compounds in the above group include bactericides, fungicides and antibiotics which may be selectively chosen for use in controlling bacteria, protozoa and fungi including *Trichomonous vaginalis, Candida albicans*, and the like.

Substances suitable for incorporation in rectal suppositories made in accordance with this invention include:

Menthol; camphor; quaternary ammonium salts; phenylmercuric nitrate; ephedrine sulfate; benzocaine, and oxyquinoline benzoate.

Among the compounds in the above group are included several of which are considered useful in the relief of hemorrhoidal and associated problems.

Substances suitable for use in absorbent tampons and vaginal suppositories made in accordance with this invention, may also include steroidal medicaments and estrogenic compounds such as:

Cortisone; estradiol; prednisolone; progesterone; pregnenolone and the salts thereof. In this group are products especially designed to reduce the discomfort and malaise associated with post-menopausal atrophy.

While the above-listed medicaments are particularly pointed out as useful in combination with the compounds of this invention, it will be seen that many other potentially useful medicaments are available. Dosages, of course, should be controlled in accordance with standard practices.

It is also understood that various identifying dyes, colors, and fillers may be incorporated in the compounds as long as they do not interfere with the desired properties as set forth herein.

What is claimed is:

1. A suppository fabricated from a compound comprising a thermoplastic, film-forming, water-soluble polymer in blend with a compatible plasticizer therefor; said polymer comprising hydroxypropyl cellulose and said plasticizer comprising an olefinic glycol of predetermined molecular weight; said plasticized polymer having dispersed throughout the internal structure and the exposed surface area thereof globules of an oleaginous lubricant; a portion of the said globules which are disposed at the surface of said plasticized polymer being at least partly in physical association with each other to provide a lubricous film on said surface.

2. The suppository of claim 1 wherein said compound is characterized by being stable at temperature up to at least about 150°F.

3. The suppository of claim 1 wherein said plasticizers are selected from the group consisting of polyethylene glycol and polypropylene glycol.

4. The suppository of claim 3 wherein said polyethylene glycol has an average weight ranging from about 200 to less than about 1500.

5. The suppository of claim 3 wherein said polypropylene glycol has an average molecular weight of less than about 750.

6. The suppository of claim 1 wherein said lubricant is selected from the group consisting of polypropylene glycol having an average molecular weight of at least about 1000, glycerine, natural and synthetic fats which are fluid at room temperature, and mineral oils.

7. The suppository of claim 4 wherein said lubricant is selected from the group consisting of polyrpropylene glycol having a molecular wieght of at least about 100, natural and synthetic fats which are fluid at room temperature, and mineral oils.

8. The suppository of claim 5 wherein said lubricant is selected from the group consisting of glycerine, nautral and synthetic fats which are fluid at room temperature and mineral oils.

9. The suppository of claim 1 wherein a medicament is mixed therein.

10. The suppository of claim 9 wherein said medicament is oleophilic.

11. The suppository of claim 9 wherein said medicament is hydrophilic.

12. The suppository of claim 9 wherein said medicament is selected from the group consisting of menthol; camphor quaternary ammonium salts; hexetidine; chloramphenicol; myralact; cloponone; mystatin; acetarsone; nitrofurazone; benzalkonium chloride and hexachlorophone.

13. The suppository of claim 9 wherein said medicament is selected from the group consisting of phenylmercuric nitrate; ephedrine sulfate; benzocaine; and oxyquinoline benzoate.

14. The suppository of claim 9 wherein said medicament is selected from the group consisting of cortisone; estradiol; prednisolone; progesterone; pregnenolone and the salts thereof.

* * * * *